United States Patent
Pouyadou et al.

(10) Patent No.: US 8,479,192 B2
(45) Date of Patent: Jul. 2, 2013

(54) DYNAMIC XPS FILTER

(75) Inventors: Jerome Pouyadou, Grenoble (FR); Victor Ciriza, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1347 days.

(21) Appl. No.: 12/163,219

(22) Filed: Jun. 27, 2008

(65) Prior Publication Data

US 2009/0328031 A1 Dec. 31, 2009

(51) Int. Cl.
*G06F 9/46* (2006.01)
*G06F 9/445* (2006.01)

(52) U.S. Cl.
USPC .......................... 717/174; 717/131; 358/1.15

(58) Field of Classification Search
USPC .. 717/127–135, 168–178; 358/1.15; 718/101, 718/106
See application file for complete search history.

(56) References Cited

U.S. PATENT DOCUMENTS

| | | | | |
|---|---|---|---|---|
| 6,173,364 | B1* | 1/2001 | Zenchelsky et al. | 711/118 |
| 7,095,518 | B1* | 8/2006 | Keeney et al. | 358/1.15 |
| 7,304,758 | B2 | 12/2007 | Ferlitsch | |
| 2003/0184784 | A1 | 10/2003 | Ferlitsch | |
| 2005/0210227 | A1 | 9/2005 | Emerson et al. | |
| 2006/0139673 | A1 | 6/2006 | Sedky et al. | |
| 2006/0224606 | A1* | 10/2006 | Sedky et al. | 707/101 |
| 2007/0165267 | A1 | 7/2007 | Fransazov | |
| 2007/0216939 | A1 | 9/2007 | Wada et al. | |
| 2007/0216944 | A1 | 9/2007 | Furuya | |
| 2007/0268527 | A1 | 11/2007 | Naota | |
| 2008/0068641 | A1 | 3/2008 | Dance et al. | |
| 2008/0120615 | A1* | 5/2008 | Huang et al. | 718/100 |
| 2008/0278741 | A1* | 11/2008 | Armstrong | 358/1.15 |
| 2009/0279122 | A1* | 11/2009 | Armstrong et al. | 358/1.15 |
| 2010/0235846 | A1 | 9/2010 | Yamamichi | |

FOREIGN PATENT DOCUMENTS

JP 2008-052361 A 3/2008

OTHER PUBLICATIONS

Microsoft Corporation, XPSDrv Filter Pipeline, Microsoft, Feb. 7, 2008, pp. 1-32.*
Microsoft, *XPSDrv Filter Pipeline: Implementation and Best Practices*, 2007, pp. 1-30.
Microsoft, *XML Paper Specification*, 2008, pp. 1-5.
Microsoft, *Printing Overview*, 2008, pp. 1-8.

* cited by examiner

*Primary Examiner* — Ted T Vo
*Assistant Examiner* — Satish Rampuria
(74) *Attorney, Agent, or Firm* — Fay Sharpe LLP (57) ABSTRACT

A system and method enhances a default workflow path of a workflow system. The system provides access to policy rules and associated triggering conditions not available to the default workflow path of the workflow system. The configured rules are stored in a repository, and may be dynamically reconfigurable. Selected ones of the rules and triggering conditions are bound to at least one resource, such as a printer. An orchestrator is installed as a default workflow path, e.g., as an XPS filter, and is thus executed during default workflow path processing for a job submitted to the default workflow path. The orchestrator may then perform additional processing functions including accessing the configured policy rules and associated triggering conditions. A processing unit may be executed if the associated triggering condition is satisfied.

23 Claims, 9 Drawing Sheets

FIG. 9 ic # DYNAMIC XPS FILTER

BACKGROUND

The exemplary embodiment relates to a system and method for managing document processing. It finds particular application in connection with a print path in which policy rules are used to implement a set of filters.

Workflow systems are widely used for processing submitted documents prior to printing. One example of a print path is the XPS print path developed by Microsoft and recently available on various platforms such as Windows Vista and Windows XP. In the XPS system, Extensible Markup Language (XML) is used for specifying the printing parameters. While it offers significant advantages in terms of document processing within the print process, it lacks several features both in terms of intuitive configuration tools, and in terms of actual workflow management.

In essence, the XPS print path system is a statically configured set of dynamic libraries called in the order stated in an XML configuration file. This system cannot easily be reconfigured dynamically. Additionally, the libraries are associated with a sequence of sequentially operated filters such that a document is sequentially processed by each of the libraries in turn before it is submitted for printing. The system does not provide for sophisticated filter execution, such as conditional execution, parallel processing of data, and other capabilities which would be of value in an advanced workflow system. Despite these relative weaknesses, the system has the advantage of being readily available on a widely distributed operating system.

INCORPORATION BY REFERENCE

The following references, the disclosures of which are incorporated herein in their entireties by reference, are mentioned:

U.S. Pub. No. 2008/0068641, entitled DOCUMENT PROCESSING SYSTEM, by Dance et al., discloses a document processing method including identifying a document which has been selected for printing that includes at least one image.

U.S. Pub. No. 2006/0139673, entitled PRINTER FILTER CONFIGURATION, by Sedky et al., discloses enabling a flexible printing subsystem with a printer filter pipeline.

U.S. Pat. No. 7,304,758, entitled DYNAMICALLY UPDATING A PRINTER DRIVER, by Ferlitsch, discloses systems and a method for dynamically installing or updating a printer driver on a computer device without requiring a user to initiate the installation or update.

BRIEF DESCRIPTION

In one aspect of the exemplary embodiment, a method for enabling execution of filters in a context richer than a default workflow path is provided. The method includes configuring a plurality of filters, each filter comprising a policy rule and an associated triggering condition. The plurality of filters is stored in a repository which is independent of the default workflow path. Selected ones of the policy rules are bound to at least one resource. An orchestrator is installed in the default workflow path which has access to the plurality of filters. The orchestrator is configured to be executed during default workflow path processing for a job submitted to the default workflow path such that triggering conditions for the filters are evaluated for the job and triggered policy rules are applied. In another aspect, a system is provided for enabling execution of filters in a context richer than a default workflow path. The system includes a default workflow path. A repository, independent of the default workflow path, stores a plurality of filters, each filter comprising a policy rule and an associated triggering condition, selected ones of the policy rules being bound to at least one resource. An orchestrator is installed in the default workflow path which has access to the plurality of filters, the orchestrator being configured to be executed during default workflow path processing for a job submitted to the default workflow path such that triggering conditions for the filters are evaluated for the job and triggered policy rules are applied.

In another aspect, a system is provided for enhancing a default workflow path of a workflow system. The system includes a repository storage system and a configuration unit for performing processing functions. The processing functions include configuring policy rules and triggering conditions not available to the default workflow path of the workflow system. The configured rules are stored in the repository. Selected ones of the rules and triggering conditions are bound to at least one resource. An orchestrator is installed in the default workflow path as a filter installed according to methods and rules provided by the default workflow path. The orchestrator can thus be executed during default workflow path processing for a job submitted to the default workflow path, and the orchestrator can perform additional processing functions including accessing the configured policy rules and associated triggering conditions. These are evaluated for each job submitted to the default workflow path and a return value is generated as a result. An action is performed on the job if the associated triggering condition is satisfied.

In another aspect, provided is a method, in a client system having a default workflow path, the default workflow path having first configured filters, the method being for dynamically updating the first configured filters, the first configured filters comprising configured first policy rules and associated first triggering conditions. The method includes configuring second configured filters, the second configured filters comprising second policy rules and associated second triggering conditions and storing the second configured filters in a repository which is independent of the default workflow path. The configured second configured filters are delivered to the client system. The delivering includes at least one of replacing the first configured filters with the second configured filters by an administrative application at the request of an authorized user and periodically polling the repository, by the client system, to determine when the second configured filters are stored in the repository, and replacing the first configured filters with the second configured filters.

DETAILED DESCRIPTION

Disclosed herein are a system and method for managing a print path.

Figure 1:
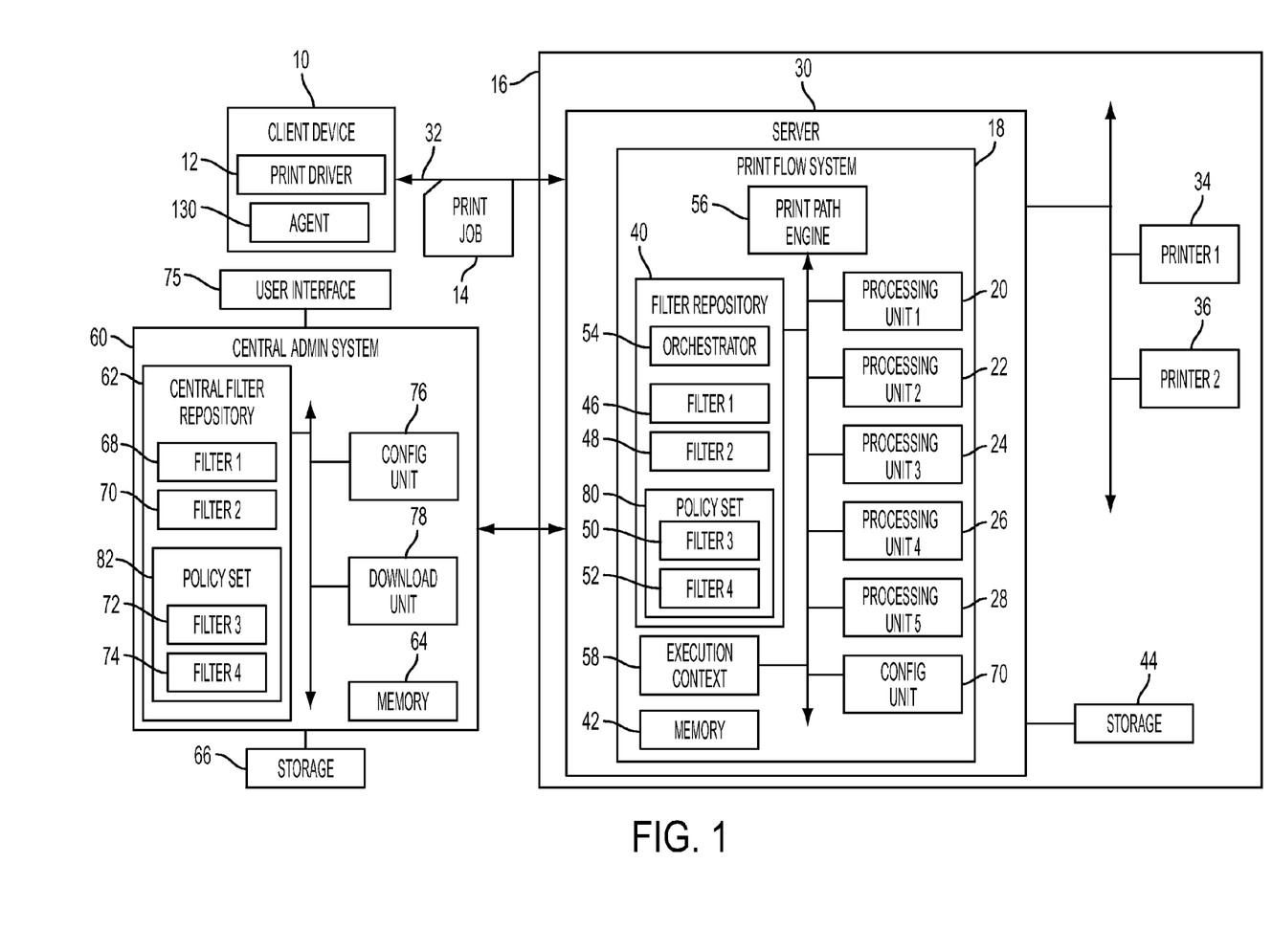
FIG. 1 is an exemplary environment in which a print path operates.

FIG. 1 illustrates an exemplary environment in which a print path operates. A document is selected for printing at a workstation 10, such as a personal computer, laptop, or the like, which may include one or more applications for generating documents. The workstation includes a print driver 12, which formats the document for outputting as a print request 14 to be submitted to a printing system 16. The print request 14 typically includes the document to be printed together with information which specifies various preprinting operations, printing operations, and/or finishing operations. This information may be embedded within the document or attached thereto as an XML file or other file. In some embodiments, this information is maintained in a print job ticket such as, e.g., an XPS print job ticket, which is associated with the document and may be updated as the document is being processed by the system. The document being processed for printing and the associated information regarding the document are referred to herein as a print job and a print job ticket, or more generally as a job and a job ticket. Although the present application is described with particular reference to printed documents, and a document as discussed herein refers to any digital file suitable for printing, it is to be appreciated that concepts of the present application are not restricted to processing of printed documents and are applicable with equal efficacy to any system utilizing workflow management for data files or groups of data files submitted for further processing. It is therefore to be appreciated that embodiments described herein are suitable for, but not limited to, printer usage policy enforcement, accounting and billing of print requests, content-based processing of print requests, and document format conversion.

The printing system 16 includes a print path system 18 which includes a set of independent processing units or libraries 20, 22, 24, 26, 28 (five in the illustrated embodiment, although fewer or more libraries are contemplated). Each of the processing units 20, 22, 24, 26, 28 includes software processing instructions, which, when executed, perform a processing operation connected with a submitted document. Exemplary processing units may include, but are not restricted to: units for printer usage policy enforcement, accounting and billing of print requests, content-based processing of print requests, document format conversion, and the like. Thus, for example, processing unit 20 may effect a printer usage policy such as allowing certain users to print documents on a high quality printer, while preventing or limiting the usage of the high quality printer by another group of users. Processing unit 22 may deal with accounting and billing, for example, by billing the printing of a document to a particular client. In one embodiment, unit 22 is capable of detecting documents whose content is likely to be personal rather than business-related and charging the print cost to the user's account or otherwise processing the document depending on an inference about the intended use of the document, as disclosed, for example, in U.S. Pub. No. 2008/0068641, incorporated herein by reference in its entirety. Processing unit 24 may be a content based processing unit, for example, one which adds a watermark or makes another image modification to the document. Processing unit 26 may be configured for document conversion for one format to another.

In the illustrated embodiment, the print path system 18 is resident on a print server 30 which is communicatively linked to the workstation 10 via a wired or wireless network 32, such as a local area network or a wide area network, e.g., the Internet. The server 30, in turn is communicatively linked by the network 32, or a separate network, to one or more resources, here illustrated as printers 34, 36. The printers are configured for rendering the document on print media, such as paper, using marking media, such as inks or toners. In other embodiments, the output device may be a display device which outputs the document on a screen. Although exemplary embodiments are described with reference to printers, any suitable output resource falls within the scope of the present application.

As will be appreciated, one or more components of the exemplary print path system 18 may be suitably located on a computing device other than the server 30, such as in the digital front end (DFE) of one or more of the printers 34, 36 or at the workstation 10, or a combination thereof.

The document processing units 20, 22, 24, 26, 28 are implemented as a set of independent libraries whose condition of execution are described by a certain number of rules (referred to as 'policy rules'), described in a computer-language-neutral manner and stored in an implementation-neutral repository 40. The repository 40 can be stored in either a server memory 42 or a server storage device 44 such as, e.g., a disk drive. In one embodiment, an XPS filter-based mechanism is used to apply these rules. FIG. 1 shows, by way of example, a set of filters 46, 48, 50, 52 which are controlled by an orchestrator 54. In exemplary embodiments, the orchestrator is invoked by an XPS print path engine 56. As a document is being processed by the orchestrator 54, appropriate processing units 20, 22, 24, 26, 28 are executed based on the triggering conditions determined by examining each of the filters 46, 48, 50, 52. In this regard, because the execution of one of the processing units may be dependent on results from a previously executed processing unit, an execution context 58 is maintained by the orchestrator 54. The execution context 58 is a set of named variables that can be created, read, modified or deleted by the various units of execution or by the orchestrator, thereby further facilitating conditional execution of each of the processing units 20, 22, 24, 26, 28. The execution context 58 can be maintained in either the server memory 42 or the server storage device 44.

The exemplary policy rules may be dynamically configured, based on, but not restricted to, XPS filters, either in a centralized or in a distributed manner. The exemplary filters are able to execute in a context richer than the default XPS print path context, and in particular offer the capability of changing their behavior based on the evaluation of conditions, while still leveraging the existing XPS print path mechanism.

The exemplary set of filters in the repository 40 can be dynamically reconfigured, e.g., by updating one or more of the filters, modifying one or more of the filters, replacing one or more of the filters, and/or adding one or more new filters. This can be done at any time, either automatically, or by an operator.

In one embodiment, the system is able to dynamically instantiate or alter XPS configurations and thus reflect instantly the changes made on the policy configuration by system administrators. In one embodiment, there is a central administration system 60, e.g., an XDM server, where a central filter repository 62, similar to the filter repository 40 on the server 30, is maintained. The central filter repository 62 can be stored in either a central administration system memory 64 or a central administration system storage device 66 such as, e.g., a disk drive. This arrangement is particularly suited to a centrally managed network of client printing systems such as printing system 16 whereby management is simplified by centralization on the central administration system 60. Of course, concepts of the present application may also be utilized in a distributed network of printing systems. Current filter versions 68, 70, 72, 74 of respective server filters 46, 48, 50, 52 are maintained and configured on the central administration system 60. An administrator or other authorized user, via a user interface 75 of the central administration system 60 updates, creates and/or deletes filters in the central filter repository 62 by means of a configuration processing unit 76.

Dynamic updating of the filters 46, 48, 50, 52 on the server 30 may be accomplished in the following manner. When there a document is submitted by a user for printing, a query is sent to the central administration system, asking for the configuration for the submitting user, and for the targeted physical printer. In response to the query, the central administration system the configuration provides a list of modules which should be executed for that user on that printer. Knowing what modules, e.g., processing units, policy sets and/or filters are available, current versions can be downloaded by means of a download unit 78. In one embodiment, the download is performed only on an as-needed basis. For example, downloading can occur if a version number on the server 30 is lower than a version number of the corresponding module on the central administration system 60. There may be additional features assisting in a download determination such as, e.g., time stamp, etc.

The concept is to be dynamic, i.e., updating filters and processing units on the server 30 as needed, essentially providing an equivalent to real-time updates which has heretofore posed a problem. However, once the necessary modules have been downloaded, they are not downloaded again except as required to instantiate updated versions. In embodiments described herein, however, the configuration for a given user, at a given moment, for a given document, and for a given physical printer, which filters apply, are downloaded each time a document is submitted for processing, i.e., transient. The core libraries, e.g., processing units, however, are not necessarily transient. Once the core libraries are downloaded, they are not as likely to be updated, thereby saving processing time by only downloading these on an as-needed basis.

It is to be appreciated that, while the aforementioned embodiment describes a central administration system 60, the concepts described can be implemented directly on the server 30. In other words, the same mechanism can be used, the same engine, the same configuration file, etc. Although there is no external source, i.e., central administration system 60, a similar effect may be achieved by offering an update queue where newly updated or added modules are made available in a manner similar to that described with reference to the central filter repository 62.

Figure 2:
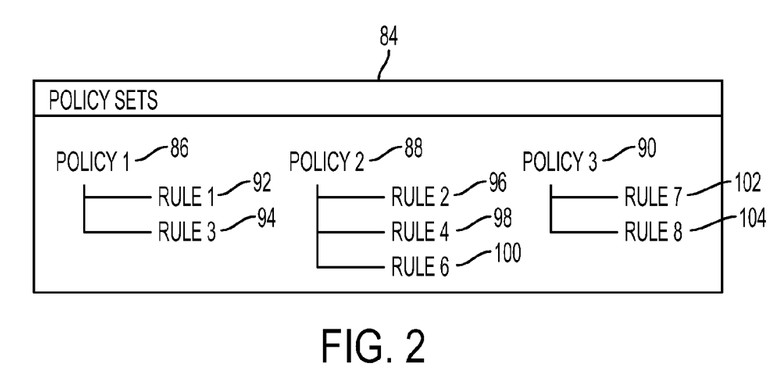
FIG. 2 is a group of policy sets for diagrammatically showing the relationship of rules to policy sets.

Policy rules, i.e., filters, can be grouped together within policy sets. As shown in the FIG. 1, filters identified as "Filter 3" and "Filter 4" on the server (numerals 50, 52) are part of a policy set 80. Likewise, corresponding filters on the central administration system 60 (numerals 72, 74) are part of a policy set 82. A policy set consists of the association of a certain number of policy rules/filters, and of the order in which these rules will be fired. With reference to FIG. 2, and continuing reference to FIG. 1, group of policy sets 84 is shown for diagrammatically showing the relationship of rules to policy sets. Each of the policy sets 86-90 consists of selected rules 92-104 associated with the respective policy set. The orchestrator 54 is a software element that has knowledge of the configuration and of all policy sets and rules. It is this element that calls each policy rule unit of execution in turn, and interprets the result. The orchestrator 54 is called from the XPS print path engine 56. In one embodiment, the orchestrator is installed as a native filter in the default workflow system. Therefore, it can advantageously be readily installed in any workflow system for extending the capabilities of the workflow system when it is executed by the system.

There is a syntax and/or a selection list to describe all of the control made available via the policy rules. On a large system having a large number of users, it can be readily appreciated that it becomes very complicated and time consuming for an administrator to manage, i.e., determining specific individual rules to apply to each user and printer of the system. By grouping rules together in policy sets, the administrator's task is eased because the administrator can decide to apply a rule set in its entirety without having to apply each individual rule. Instead of choosing from and applying, e.g., a hundred or more rules, the administrator may only have to choose from a small number of rule sets.

Figure 3:
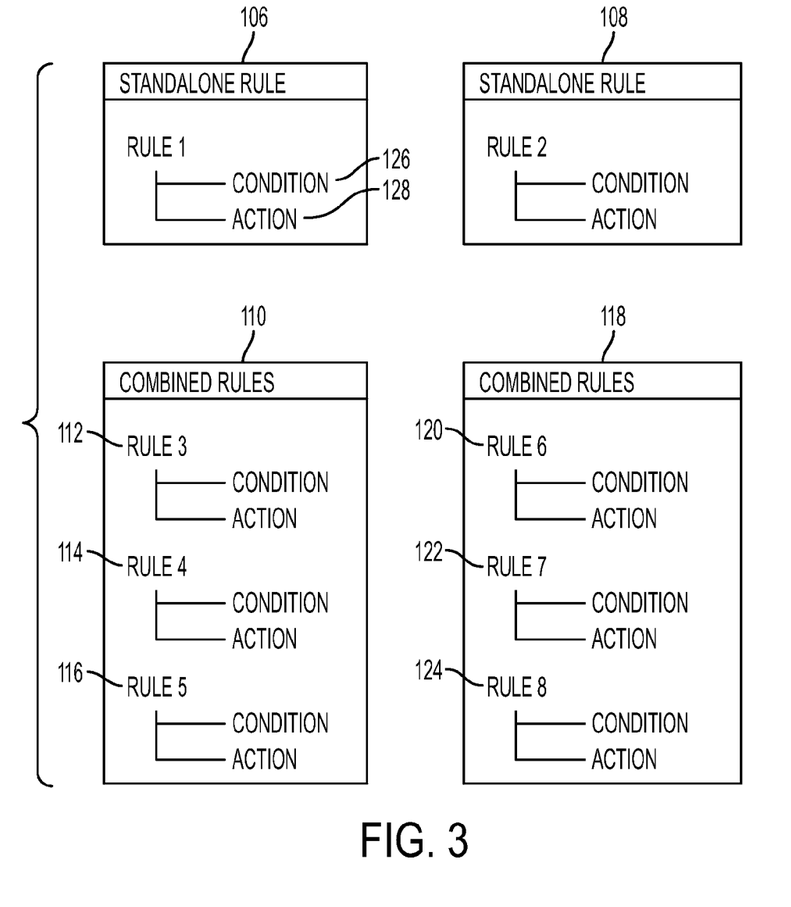
FIG. 3 is an exemplary arrangement of rules.

In one embodiment, each code unit, i.e., policy rule, is implemented as an XPS filter. In another embodiment, several code units are combined into one special XPS filter that would act as a container for those code units. With reference now to FIG. 3, an exemplary arrangement of rules is shown diagrammatically. Shown in the FIGURE are two standalone rules 106, 108 which are configured and processed as previously described. However, a combined rule set 110 includes, e.g., three rules 112-116. Similarly, combined rule set 118 includes three rules 120-124. This arrangement can be useful, for example, to allow for parallel processing of code units when the native filter implementation, i.e., the default implementation, e.g., XPS filter implementation, does not support this feature. It is to be appreciated that, while the grouping of rules into combined rule sets looks diagrammatically similar to the grouping of rules into policy sets, it is for a fundamentally different reason, i.e., parallel processing as opposed to grouping rules for ease of administration. It is to be appreciated, however, that the two grouping concepts may be mutually beneficial.

The exemplary policy rules may operate as follows. Each policy rule consists of the association of a condition 126 and an optional action 128. Each action consists of a unit of execution, e.g., executable code entered by an administrator, possibly invoking one of the independent processing units or libraries 20-28, which returns an action result which the orchestrator 54 can examine to determine what actions should occur next, e.g., termination of the document printing process, application of another policy rule, etc. Application of a policy rule results in the policy rule being "fired" at some stage. Firing of a policy rule consists of execution of the code unit of execution, which after execution returns a result to the caller.

Referring again to the execution context 58 of FIG. 1, as previously described, the execution context is a set of named variables that can be created, read, modified or deleted by the various units of execution or by the orchestrator. In one embodiment, an XPS print job ticket, which is an XML-based system, is used to carry information from XPS filter to XPS filter. The XPS print job ticket provides for public properties, i.e., a well-known set of agreed-upon, general purpose properties, such as, e.g., normalized paper sizes. The XPS print job ticket also provides for private properties which are only meaningful to specific components. In one embodiment the private properties are used to carry along status information between execution units. Some particular execution units' return values may then be mapped to events or return values specific to the print path engine 56, thus acting on the print request. For example, specified non-zero execution unit return values could be mapped to an ABORT order sent out to the print path engine. Execution unit return values of zero could indicate that path processing should continue normally without taking any additional action. It is to be understood that the ABORT order is only an exemplary action, and non-zero execution unit return values could indicate any desired action based on the return value.

Figure 4:
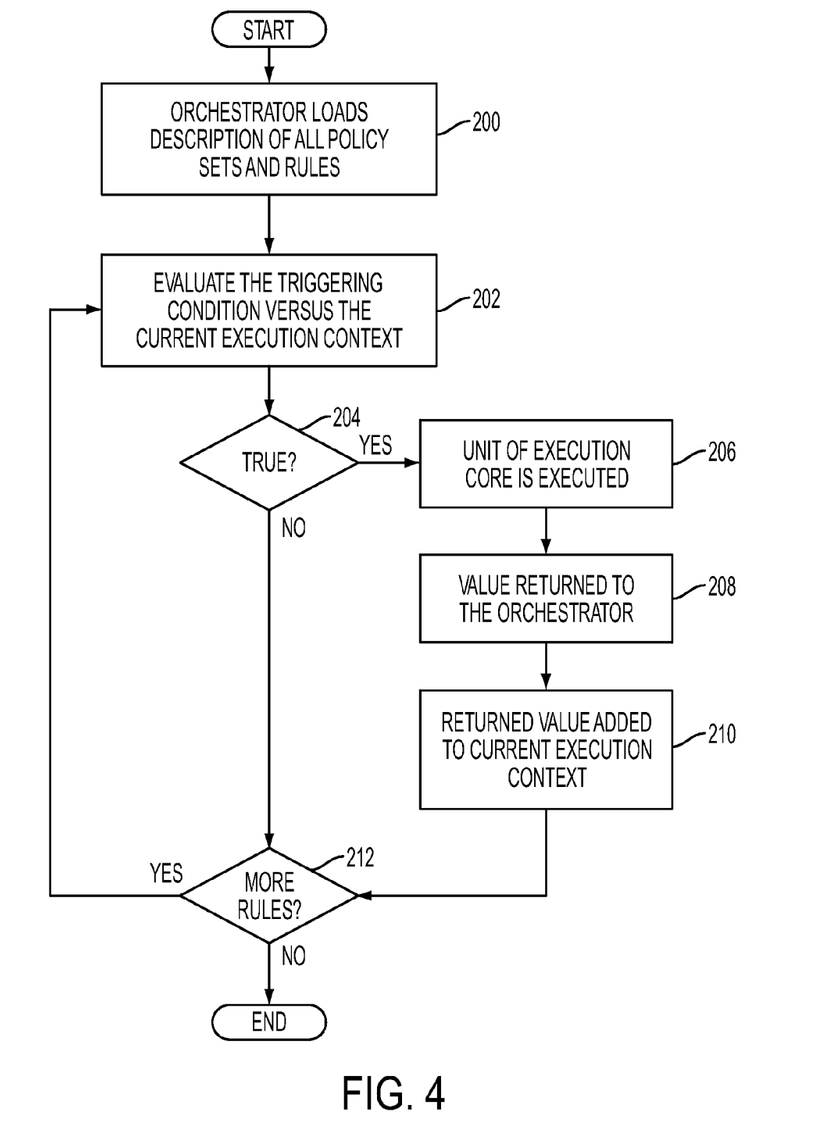
FIG. 4 is a flowchart showing operation of embodiments when given a document to process.

With reference now to FIG. 4, and continuing reference to FIG. 1, an exemplary method may operate as follows when given a document to process. At step 200, the orchestrator 54 loads the description of all policy rules from the filter repository 40 if not previously loaded. Then, for each rule, at step 202, the orchestrator evaluates a triggering condition of the rule against the current context of execution. If this evaluation is determined to be true at step 204, e.g., a true Boolean value, a unit of execution core associated with the rule is executed at step 206, e.g., one of the processing units 20-28 is executed. Once the core has executed, it provides a return value to the orchestrator at step 208. The return value is added to the current execution context 58 so as to be available for the evaluation by the orchestrator 54 of the next triggering condition, if any, as determined at step 212. It is to be understood, however, that the return value can also be one of a set of special values such as the ABORT order previously described. These special values can denote a stop condition, i.e., cases where the normal chain of operation is to be aborted. This can occur when there is a condition previously determined to be a serious condition such as, e.g., a memory fault or lack of rights of access by the user. In this instance, it is not necessary to process any remaining rules.

Figure 5:
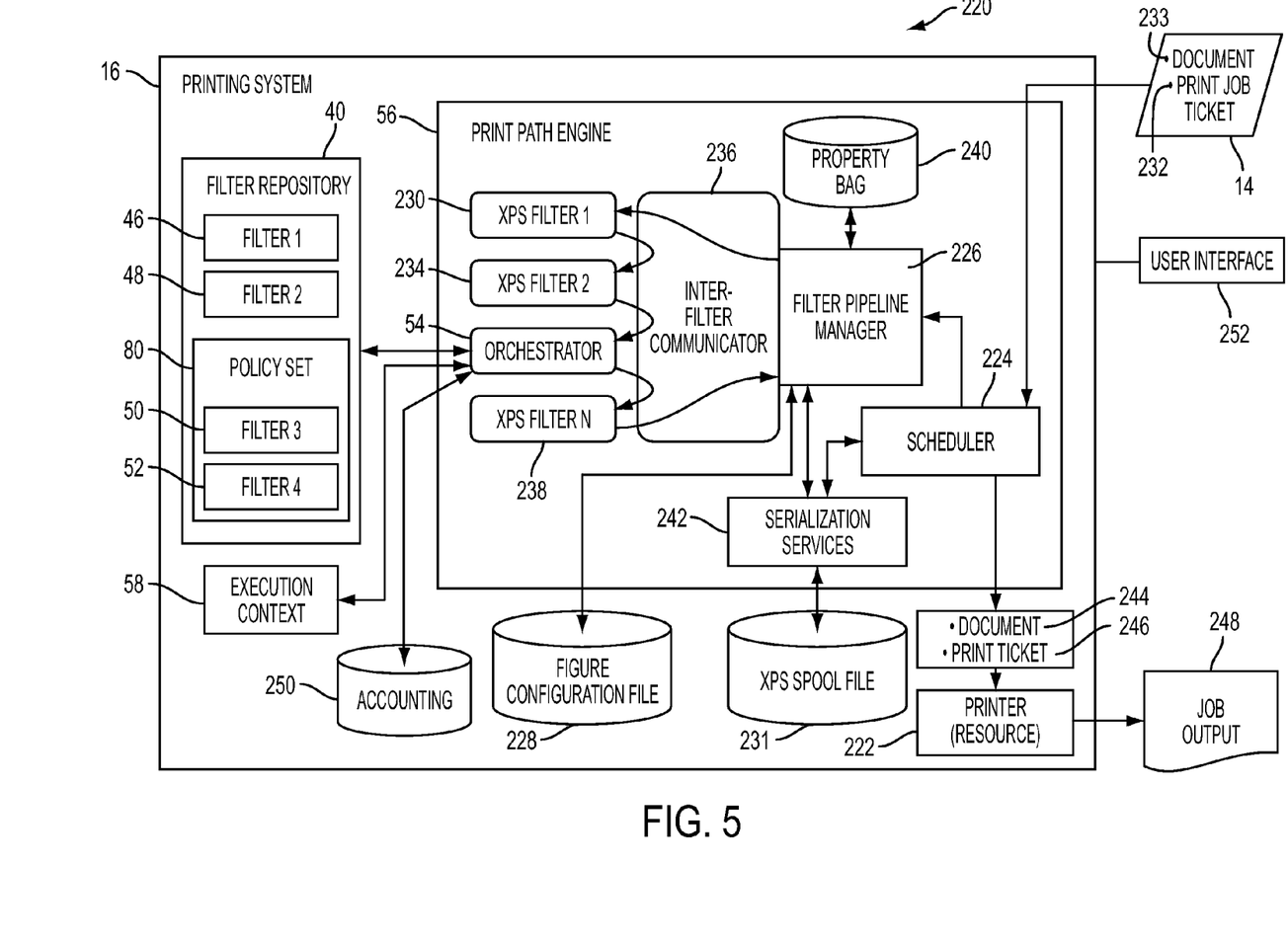
FIG. 5 is an exemplary processing arrangement of an embodiment in a workflow system.

With reference now to FIG. 5, and with continuing reference to FIG. 1, an exemplary processing arrangement 220 of an embodiment in a workflow system is shown. Like numerals represent like elements of FIG. 1. While FIG. 1 is directed toward describing administration and operation of embodiments of the present application, FIG. 5 is directed toward describing the installation and interaction of the embodiments with the workflow system. The particular workflow system shown is the XPS print path, but the present application is not limited to a particular workflow system. Further, although FIG. 5 shows only one resource, i.e., the printer 222, exemplary embodiments typically include a plurality of resources.

Briefly, operation of the print path engine 56, i.e., the XPS print path, is first described. A print job request 14 is received from a client device for processing, and the scheduler 224 signals the filter pipeline manager 226 to begin processing. The filter pipeline manager reads the filter configuration file 228 and creates a filter pipeline by loading the filters that are listed in the filter configuration file 228 for the selected printer 222. The first filter, i.e., XPS filter 1 (230) in the filter pipeline reads the contents of the XPS spool file 231. The first filter 230 reads the document parts 233 and XML print job ticket 232 from the job request 14 and processes the document accordingly. The first filter 230 sends the processed document parts to the second filter 234 by using an interface provided by an inter-filter communicator 236. The inter-filter communicator 236 maintains intermediate processing results until the next filter is ready to process them. This process continues until the last filter 238 has processed the document and XML print job ticket, unless of course the document processing has been aborted prior to the last filter. Information about the printer 222 and the print job may also be stored in the print pipeline property bag 240 for the XPS filters 230, 234, 238 to use. The filters can access information stored in the property bag 240 and can use the stored information share data. Serialization services 242 provides services for serializing data streams flowing between the XPS spool file 231 and the filter pipeline manager 226 and the scheduler 224.

Turning now to the exemplary embodiment, the orchestrator 54 is shown as being installed in the filter pipeline of the XPS filters 230, 234, 238. This illustrates one of several possible methods for installing embodiments of the present application. One installation method utilizes a special filter, i.e., the orchestrator 54. In one embodiment, the orchestrator 54 is installed in the filter path for each printer with which it is to be utilized. In another embodiment, it is installed with a single printer such that it could serve as a frontend to a system that can implement more complex rules, i.e., embodiments described herein. Installation in this manner provides conditional execution based on selection by a user or content of the document. Optionally, more than one orchestrator is provided. For example, one of a set of orchestrators can be installed to provide different levels of control such as, e.g., control on the images within the document, control on the footprint of the job itself, e.g., number of pages, full-color images which consume a lot of ink, etc. This type of processing is more complex than available in the default XPS filters.

The exemplary embodiments described herein provide more complex filters, and also enable application of the more complex filters conditionally. For example, based on the physical destination of the printer, based on the workstation or user, the processing can change as if the set of filters had been dynamically changed. Accomplishing dynamic changes in the XPS print path currently requires stopping and restarting print subsystems while filters are being changed, which would not be practical. Embodiments described herein, on the other hand, offer this additional capability without requiring manual intervention or the stopping and restarting of subsystems. The embodiments described provide a convenient means of extending the capabilities of the print path engine in a flexible manner, thereby providing extended capabilities for processing or modifying the input document 233 and/or the input print job ticket 232 and providing a modified output document 244 and/or a modified output print job ticket 246 as part of the job output 248.

The capabilities of the embodiments described herein are facilitated by the ability to maintain the filter repository 40 and/or the execution context 58 separately from the print path engine 56 facilities, essentially unknown to the print path engine 56, and independent of the print path engine and default facilities. This feature facilitates making the repository 40 an implementation-neutral repository. This further enables the filters and execution context to have unlimited flexibility, not bounded by constraints of the print path engine facilities. In fact, the orchestrator 54 can maintain separate information files such as, e.g., an accounting file 250 which can be utilized to generate billing and utilization reports either through a user interface display 252 or an output resource 222 of the system.

Embodiments described with reference to FIG. 5 are now summarized with reference to FIG. 6. One or more orchestrators are installed as a standard component of a print path engine, e.g., a filter of the print path engine (step 260). Additional filters are configured in a filter repository outside of the print path engine, unknown to the print path engine itself (step 262). One or more of the installed orchestrators are then invoked either conditionally as previously described, or with each processing of a print job request for a specific printer, or a plurality of specified printers, or all printers available to the print path engine (step 264). In fact, the specific printer may be a virtual printer utilized only for the purpose of activating an orchestrator. When an orchestrator 54 is activated, it processes the filters of the filter repository, performing actions based on the document itself and/or the associated print job ticket (step 266). The performed actions can include modifications to the document or print job ticket, aborting of the print job, or other processing such as, e.g., maintaining an accounting file and producing an accounting or utilization report at the request of a user or on a periodic basis.

While the exemplary embodiment described herein are described as utilizing the XPS print job ticket 14B for storing and communicating information during the processing of a document, it is to be appreciated that the property bag 240 or any other mechanism provided by the print path engine can be utilized for this purpose. Further, while the orchestrator 54 is shown installed as a filter in the print path engine, i.e., an XPS filter in the XPS print path, it is to be appreciated that the orchestrator can be installed using any method provided by a particular print path engine, not necessarily as a filter. The orchestrator can be installed in any method provided by the default or native print path engine as long as the orchestrator is provided a means of communicating with the print path processing. Installing the orchestrator 54 similar to standard components of the print path or workflow path offers a convenient method of extending the capabilities of the print path engine without modifying the print path engine itself.

Returning again to the subject of policy and rule configuration, as previously described, the system of policy rules can be configured entirely on the computing device on which the code units will run, such as, e.g., the printing system 16, or the system can be managed centrally such as, e.g., on the central administration system 60, which allows for a simplified administration. In either case, with reference now to FIG. 7, an administrator of such a system configures policy rules (step 280), and optionally binds them into one or more policy sets (step 288). These rules, each comprising triggering conditions and a code unit, are then stored in the filter repository 40. The policy sets, i.e., sets of rules in turn, can be configured to a specific resource, such as, e.g., a particular printer (step 290). In other words, once rule sets are created, they can be bound to printer queues, so that the rules are applied whenever a print request is made against them.

Figure 7:
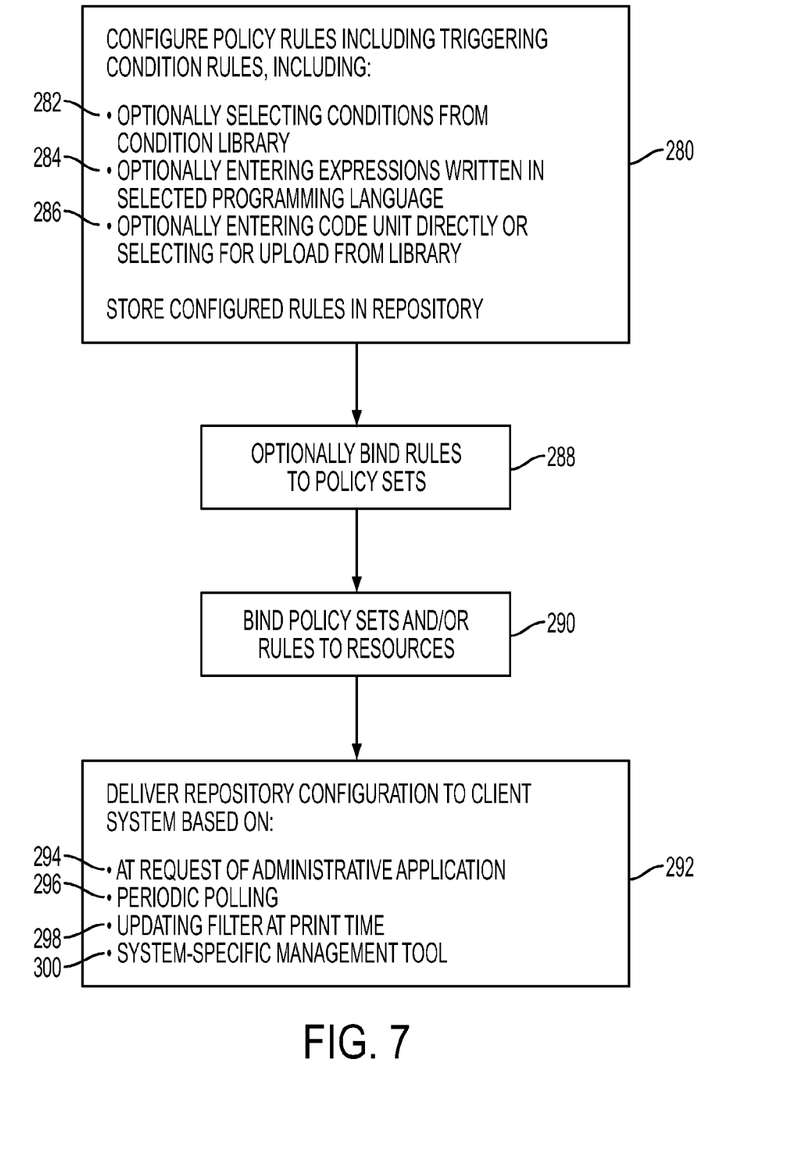
FIG. 7 is a flowchart showing configuration of policy rules by an administrator.

The triggering condition may be one of a set of standardized conditions from which the administrator can choose (step 282), or the triggering condition may be written in a language specific to the system or in any known processing language (step 284), the list of which can be augmented via a pluggable interpreter mechanism. Return values are not limited to a simple zero versus non-zero case, however, it is expected that a simple evaluation of the return value of the last-executed rule against only one value would form the basis of most triggering conditions, similar to the following exemplary code snippet:

If returnValue Equals 1 Then trigger action End If

In the above-described exemplary case no programming would be required except for the code snippet itself. However, if programming is utilized, the administrator can enter/program a code unit directly or select a preprogrammed unit for uploading from a library or elsewhere (step 286).

Once the rules have been properly configured on the repository 40, they are ready to be used while processing print requests. For this to be achieved the print system, either located on individual computers or on centralized servers, both referred to hereinafter as 'client systems', can be made aware of the new configuration (step 292). In one embodiment for the installation of the rules on the client system, a software agent 130 is located on the client system that accepts requests from the central administration system 60 (step 294), or polls the repository 40 on a periodic basis (step 296), so as to be made aware of configuration changes. It downloads the various required pieces of software such as, e.g., the XPS filters, along with possibly needed companion files to each client computer/system. If need be, local administrative tasks (perhaps local spooler restarting or print driver updates) would be carried along by the agent also.

In another embodiment, a specific XPS filter carries the same task as the above mentioned agent, but proceeds with configuration updates at the time of the print request (step 298). While this solution could somewhat add to processing time, it could be used in contexts where using additional software agents is not desirable, or is impossible.

In another embodiment, system-specific management tools and/or custom installation modules are utilized (step 300). These tools, in some cases, offer numerous system update capabilities and have the advantage of being already deployed in current systems.

Figure 8:
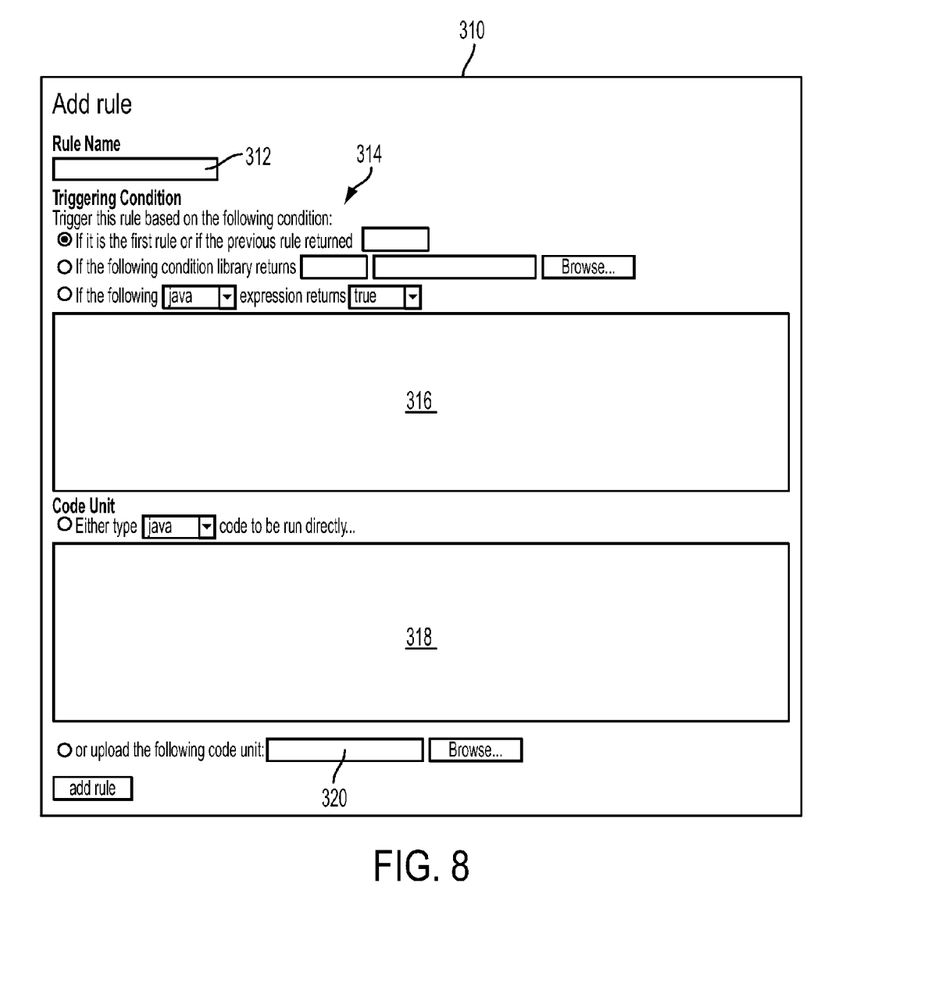
FIG. 8 is an exemplary embodiment of an administrative interface for administering the system on a web application.

With reference now to FIG. 8, one possible embodiment of an administrative interface for administering the system could operate in the context of a web application. An exemplary screen for adding rules 310 includes a Rule Name text box 312 for naming the rule. A trigger selection area 314 permits the administrator to select the type of triggering mechanism and associated values. Arbitrary expressions such as the above-described exemplary code snippet, when necessary, can be entered directly into an expression input area 316. Provision is also made for directly entering filter code units in a code unit programming area 318, or uploading a preprogrammed code unit by specifying its location in a code unit upload area 320.

Figure 9:
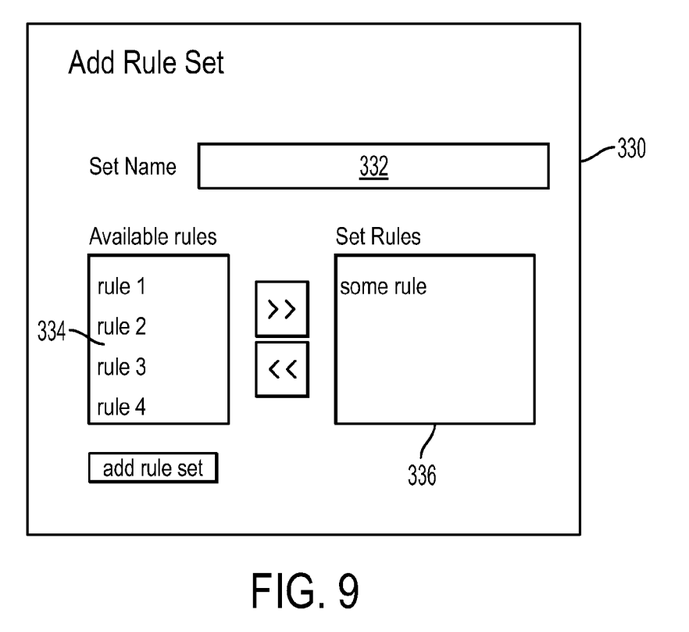
FIG. 9 is exemplary screen for adding rules to a policy set on a web application.

With reference now to FIG. 9, created rules can be added to one or more groups. An exemplary screen for adding rules to a policy set 330 is shown. A Set Name text box 332 enables the administrator to specify a name for the policy set, and the administrator can select from available rules 334 for inclusion with the set rules shown in the Set Rules box 336.

Figure 6:
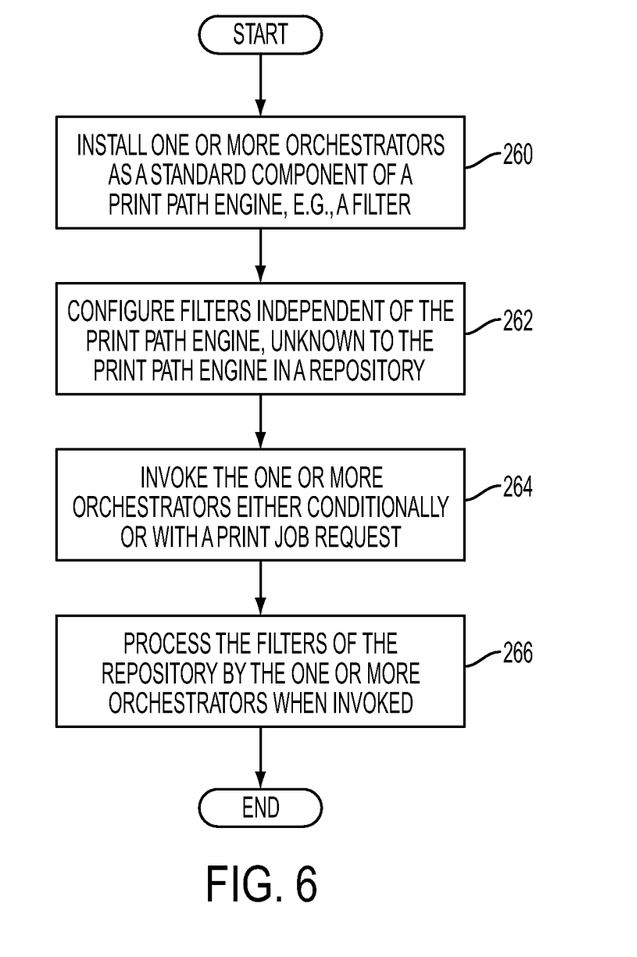
FIG. 6 is a flowchart showing a method of installing and executing filters.

It is to be appreciated that the administrative web based screens shown in FIGS. 6-7 are for exemplary purposes only. Further, the exemplary screens shown assume a sequential execution of rules, however, other embodiments could include provision for specifying parallel processing of selected rules. The present application is not limited to the exemplary screens shown.

Operation of an exemplary embodiment of the orchestration above-described policy rule mechanisms in an XPS print path scenario is now described. The user of a client system issues a print request for a document, i.e., a print job request. The spooler, e.g., print path engine 56, then routes the document print data to a printer queue for the specified printer. Note that the printer is not necessarily a printer that natively understands the XPS format, but XPS print filters are utilized in its print path, thus making XPS data available to the orchestrator 54. The orchestrator 54 intercepts the XPS data as it passes through the print path, and, based on user information of the requesting user, on the XPS data, and on the policy rules, acts on the data. In this exemplary embodiment, the orchestrator 54 could be implemented as the first filter in the XPS print path, thereby enabling it to have the desired control of document processing in the print path.

Outcomes of the processing by the orchestrator can vary in any conceivable way, including, e.g.: no action (passthrough); print job cancellation; print job routing to another printer; accounting; document modification of any sort; statistics computation; storage of document for later retrieval. These outcomes, as previously described, can be effected by utilization of the processing units 20-28. The present application, however, is not limited to these described outcomes, and other usages and outcomes are envisioned. Further, the described outcomes can be effected directly by execution of the execution unit of one of the actions 128.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for enabling execution of filters in a context richer than a default workflow path, the method comprising:
    configuring a plurality of filters, each filter comprising a policy rule and an associated triggering condition;
    configuring at least one unit of execution associated with at least one of the policy rules and associated triggering condition, wherein the unit of execution comprises executable code;
    storing the plurality of filters in a repository which is independent of the default workflow path;
    binding selected ones of the policy rules to at least one resource; and
    installing an orchestrator in the default workflow path which has access to the plurality of filters and the at least one unit of execution, the orchestrator being configured to be executed during default workflow path processing for a job submitted to the default workflow path such that triggering conditions for the filters are evaluated for the job and triggered policy rules are applied;
    evaluating at least one of the triggering conditions for the job submitted to the default workflow path and generating a return value based on the evaluating; and
    executing a processing unit based on the policy rule if the associated triggering condition is satisfied based on the step of evaluating, wherein executing the processing unit includes executing the unit of execution associated with the policy rule.

2. The method of claim 1, the method further comprising:
    binding a plurality of policy rules to at least one policy set, the set of policy rules governing an order in which the policy rules in the set are to be applied; and
    wherein the step of binding selected ones of the policy rules and associated triggering conditions to at least one resource comprises binding selected ones of the at least one policy set to at least one resource.

3. The method of claim 1, the method further comprising:
    storing, by the orchestrator, of the return value in an execution context; and
    wherein the step of evaluating each of the triggering conditions for the job submitted to the default workflow path includes utilizing return values stored in the execution context for previously submitted jobs.

4. The method of claim 1, wherein:
    the resource comprises a printer;
    the default workflow path comprises a print path; and
    the submitted job comprises a submitted print job.

5. The method of claim 4, wherein the print path comprises an eXtensible Markup Language (XML) specification print path.

6. The method of claim 1, wherein the orchestrator comprises a filter.

7. The method of claim 1, further comprising:
    providing for the set of filters in the repository to be reconfigured.

8. A computer-based system for enabling execution of filters in a context richer than a default workflow path, the system comprising:
    memory which stores:
        a default workflow path;
        a repository, independent of the default workflow path, which stores a plurality of filters, each filter comprising a policy rule and an associated triggering condition, selected ones of the policy rules being bound to at least one resource;
        an orchestrator installed in the default workflow path which has access to the plurality of filters, the orchestrator being configured to be executed during default workflow path processing for a job submitted to the default workflow path such that triggering conditions for the filters are evaluated for the job and triggered policy rules are applied;
        a second repository;
        a second configuration unit, related to the second repository, configured to perform a third set of processing functions comprising:
            configuring second policy rules and associated second triggering conditions not available to the default workflow path of the workflow system;
            storing the configured second policy rules and associated second triggering conditions in the second repository; and
            binding selected ones of the second policy rules and associated second triggering conditions to at least one resource; and
        a download unit configured to perform a delivery process comprising replacing the first policy rules and associated first triggering conditions in the first repository with the second policy rules and associated second triggering conditions;
    the computer-based system executing the filters.

9. The system of claim 8, further comprising:
    a configuration unit for configuring policy rules and associated triggering conditions specifying capabilities not available to the default workflow path of the workflow system and storing the configured policy rules and associated triggering conditions in the repository.

10. The system of claim 8, wherein the orchestrator comprises a filter installed as a standard component of the default workflow path.

11. The system of claim 8, wherein the orchestrator is configured to be executed during default workflow path processing for a job submitted to the default workflow path, and wherein the orchestrator is configured to perform a set of processing functions comprising:
    accessing the policy rules and associated triggering conditions;
    evaluating at least one of the triggering conditions for the job submitted to the default workflow path and generating a return value based on the evaluating; and
    executing a processing unit based on the policy rule if the associated triggering condition is satisfied based on the step of evaluating.

12. The system of claim 8, wherein the set of filters is dynamically modifiable.

13. The system of claim 8, wherein the download unit is configured to perform the delivery process by at least one of:
    replacing the first policy rules and associated first triggering conditions in the first repository with the second policy rules and associated second triggering conditions when invoked by an administrative application at the request of an authorized user; and periodically polling the repository to determine when the second policy rules and associated second triggering conditions are stored in the second repository, and replacing the first policy rules and associated first triggering conditions with the second policy rules and associated second triggering conditions.

14. The system of claim 8, further comprising:
a central administration system, wherein the central administration system comprises:
the second repository;
the second configuration unit; and
the download unit.

15. The system of claim 14, wherein the system comprises one of a plurality of client systems, and wherein each of the client systems is administered by the central administration system.

16. The system of claim 8, wherein a plurality of policy rules and associated triggering conditions are bound into at least one policy set, the policy set governing the order in which the rules in the policy set are applied.

17. The system of claim 8, further comprising an execution context which is updated as the triggering conditions for the filters are evaluated for the job and triggered policy rules are applied.

18. The system of claim 8, further comprising:
a plurality of processing units, each of the processing units including software processing instructions which, when executed, perform a processing operation for the submitted job, whereby a selected one of the plurality of processing units is executed by operation of a triggered rule.

19. The system of claim 8, wherein:
the resource comprises a printer;
the default workflow path comprises a print path; and
the submitted job comprises a submitted print job.

20. A method of enabling the execution of filters in a context richer than a default workflow path, the method comprising:
providing a computer-based system which executes filters, the system comprising:
memory which stores:
a default workflow path;
a repository, independent of the default workflow path, which stores a plurality of filters, each filter comprising a policy rule and an associated triggering condition, selected ones of the policy rules being bound to at least one resource;
an orchestrator installed in the default workflow path which has access to the plurality of filters, the orchestrator being configured to be executed during default workflow path processing for a job submitted to the default workflow path such that triggering conditions for the filters are evaluated for the job and triggered policy rules are applied;
a second repository;
a second configuration unit, related to the second repository, configured to perform a third set of processing functions comprising:
configuring second policy rules and associated second triggering conditions not available to the default workflow path of the workflow system;
storing the configured second policy rules and associated second triggering conditions in the second repository; and
binding selected ones of the second policy rules and associated second triggering conditions to at least one resource; and
a download unit configured to perform a delivery process comprising replacing the first policy rules and associated first triggering conditions in the first repository with the second policy rules and associated second triggering conditions;
inputting a job to the default workflow path; and
processing the job with the orchestrator installed in the default workflow path, including applying the set of filters to the job, including evaluating the triggering conditions for the filters and applying triggered policy rules.

21. For a client system having a default workflow path, the default workflow path having first configured filters, a method for dynamically updating the first configured filters, the first configured filters comprising configured first policy rules and associated first triggering conditions, the method comprising:
installing an orchestrator in the default workflow path, the orchestrator comprising a filter installed as a standard component of the default workflow path, and wherein the orchestrator is configured to be executed during default workflow path processing for a job submitted to the default workflow path;
configuring second configured filters, the second configured filters comprising second policy rules and associated second triggering conditions;
storing the second configured filters in a repository which is independent of the default workflow path; and
delivering the configured second configured filters to the client system, the delivering comprising at least one of:
when the orchestrator is executed, during default workflow path processing, replacing the first configured filters with the second configured filters by the orchestrator when requested by an administrative application at the request of an authorized user; and
periodically polling the repository, by the client system, to determine when the second configured filters are stored in the repository, and replacing the first configured filters with the second configured filters.

22. The method of claim 21, wherein the first configured filters further comprise at least one first unit of execution, the first unit of execution comprising first executable code; and the second configured filters further comprise at least one second unit of execution, the second unit of execution comprising second executable code.

23. The method of claim 21, wherein the configuring the second configured filters includes binding each second configured filter to a resource.

* * * * *